(12) United States Patent
Kang et al.

(10) Patent No.: US 11,066,203 B2
(45) Date of Patent: Jul. 20, 2021

(54) AUTOMATIC ALIGNMENT AND LABEL ATTACHING APPARATUS FOR TEST TUBE

(71) Applicant: Energium Co., Ltd., Seoul (KR)

(72) Inventors: Junghun Kang, Seoul (KR); Kanghee Lee, Seoul (KR); Hophyang Ryu, Seoul (KR); Sangjun Park, Seoul (KR)

(73) Assignee: ENERGIUM CO., LTD., Seoul (KR)

( * ) Notice: Subject to any disclaimer, the term of this patent is extended or adjusted under 35 U.S.C. 154(b) by 76 days.

(21) Appl. No.: 16/442,140

(22) Filed: Jun. 14, 2019

(65) Prior Publication Data

US 2019/0389612 A1 Dec. 26, 2019

(30) Foreign Application Priority Data

Jun. 20, 2018 (KR) ........................ 10-2018-0071017

(51) Int. Cl.
| | |
|---|---|
| *B65D 3/02* | (2006.01) |
| *B01L 9/06* | (2006.01) |
| *B65C 9/02* | (2006.01) |
| *B65C 9/06* | (2006.01) |
| *B65C 9/40* | (2006.01) |
| *G01N 35/02* | (2006.01) |
| *B65C 3/02* | (2006.01) |

(52) U.S. Cl.
CPC ........ *B65C 3/02* (2013.01); *B01L 9/06* (2013.01); *B65C 9/02* (2013.01); *B65C 9/06* (2013.01); *B65C 9/40* (2013.01); *G01N 35/026* (2013.01); *B01L 2200/025* (2013.01); *B01L 2300/021* (2013.01); *B01L 2300/0609* (2013.01)

(58) Field of Classification Search
CPC .... B65C 3/02; B65C 9/02; B65C 9/06; B65C 9/40; B01L 9/06; B01L 2200/025; B01L 2300/021; B01L 2300/0609; G01N 35/026
See application file for complete search history.

(56) References Cited

U.S. PATENT DOCUMENTS

| 9,598,197 B2 * | 3/2017 | Sato | ....................... B65C 9/1865 |
| 2015/0197362 A1 * | 7/2015 | Sato | ....................... G01N 35/04 |
| | | | 156/363 |

FOREIGN PATENT DOCUMENTS

CN 106005966 B * 11/2018

OTHER PUBLICATIONS

Translation of CN-106005966-B, Nov. 2018 (Year: 2018).*

* cited by examiner

*Primary Examiner* — George R Koch
(74) *Attorney, Agent, or Firm* — Devlin Law Firm LLC; James M. Lennon

(57) ABSTRACT

Provided is a test tube automatic alignment and label attaching apparatus including a basket formed in a box shape and whose upper surface is open to receive a plurality of test tubes and having a concave bottom surface; a test tube supply device mounted inside the basket and configured to discharge test tubes received in the basket to one side of the basket; and a test tube feeder configured to move the test tubes discharged from one side of the basket. Various other embodiments are available.

17 Claims, 12 Drawing Sheets

AUTOMATIC ALIGNMENT AND LABEL ATTACHING APPARATUS FOR TEST TUBE

CROSS-REFERENCE TO RELATED APPLICATION(S)

This application is based on and claims priority under 35 U.S.C. § 119 to Korean Patent Application No. 10-2018-0071017, filed on Jun. 20, 2018, in the Korean Intellectual Property Office, the disclosure of which is incorporated by reference herein in its entirety.

BACKGROUND OF THE INVENTION

Field of the Invention

The present invention relates to a test tube automatic alignment and label attaching apparatus that aligns test tubes of a non-alignment state and that attaches labels to the test tubes in order to attach labels to the test tubes.

Description of the Related Art

Test tubes are used for storing various samples of blood, animals, and plants, and chemicals, and labels are attached to display sample information of such test tubes.

A work that attaches labels to a plurality of test tubes requires a considerable workload, and when a person performs the work, a quality of results of the work may be deteriorated or the labels may be erroneously attached.

In order to reduce a workload of label attachment and to improve accuracy and a quality of the work, an automated apparatus may be used, and the apparatus has inconvenience that should align in advance and supply test tubes according to a state of a label attaching apparatus.

SUMMARY OF THE INVENTION

The present invention has been made in view of the above problem and provides a test tube automatic alignment and label attaching apparatus that attaches automatically labels to test tubes even when supplying the test tubes without separate alignment of the test tubes by improving a structure of a basket test tube supply device and a test tube feeder.

In accordance with an aspect of the present invention, a test tube automatic alignment and label attaching apparatus includes a basket formed in a box shape and whose upper surface is open to receive a plurality of test tubes and having a concave bottom surface; a test tube supply device mounted inside the basket and configured to discharge test tubes received in the basket to one side of the basket; and a test tube feeder configured to move the test tubes discharged from one side of the basket.

In accordance with another aspect of the present invention, a test tube automatic alignment and label attaching apparatus includes a basket configured to receive a plurality of test tubes; a test tube supply device including a first buffer configured with a swing bar, a first seating groove, an inclined wall, and a first sensor, and a second buffer configured with a second seating groove, a conveyor, a releasing device, and a second sensor; a test tube feeder configured to move the test tube discharged from the test tube supply device; a label attaching apparatus configured to attach a label to a surface of a test tube; and a controller configured to receive information from the first sensor and the second sensor and to control driving of the swing bar, the inclined wall, the conveyor, the releasing device, and the test tube feeder.

BRIEF DESCRIPTION OF THE DRAWINGS

The objects, features, and advantages of the present invention will be more apparent from the following detailed description in conjunction with the accompanying drawings, in which.

DETAILED DESCRIPTION OF EMBODIMENTS

Hereinafter, exemplary embodiments of the present invention will be described in detail with reference to the accompanying drawings. The same reference numbers are used throughout the drawings to refer to the same or like parts. Further, detailed descriptions of well-known functions and structures incorporated herein may be omitted to avoid obscuring the subject matter of the present invention.

Figure 1A:
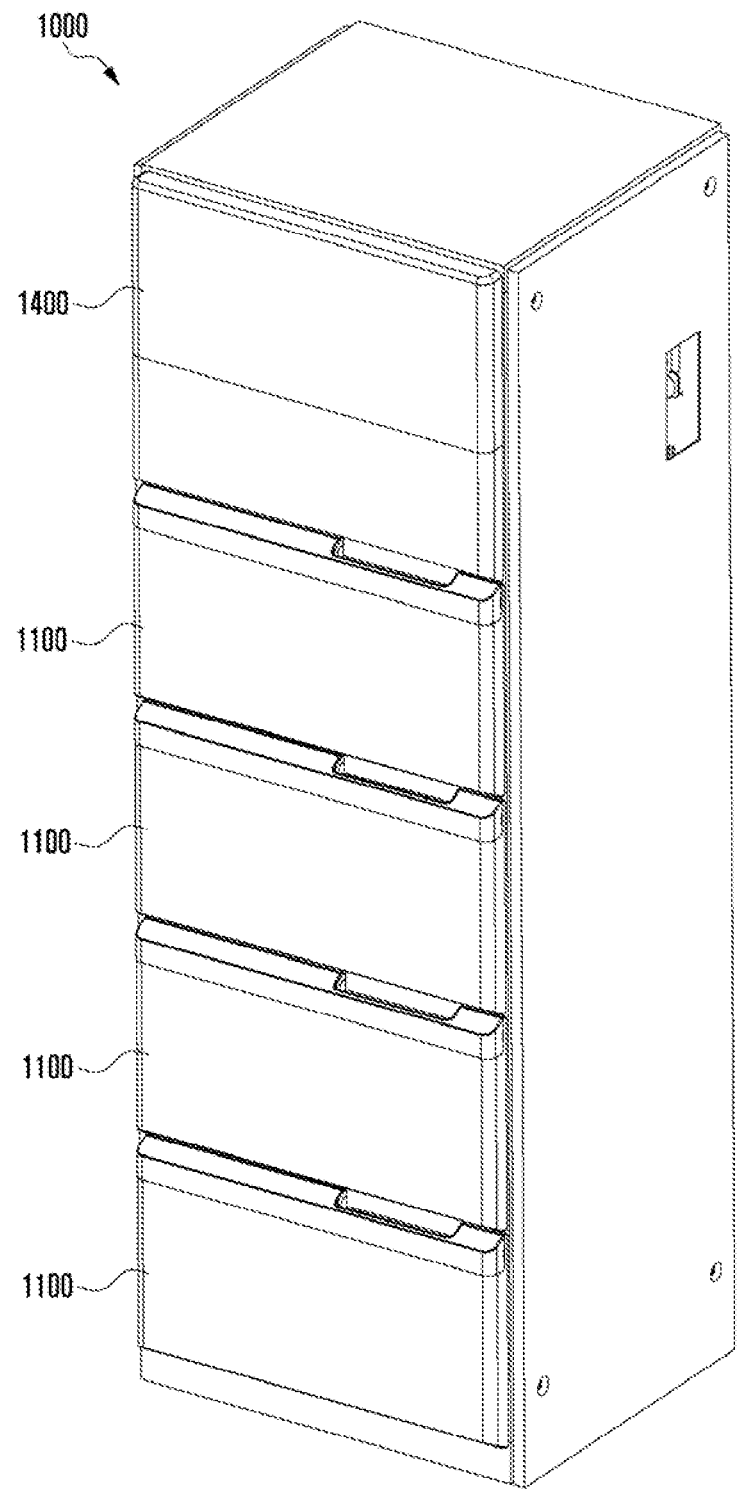
FIGS. 1A to 1C are perspective views illustrating an external form of a test tube automatic alignment and label attaching apparatus in various angles according to an embodiment of the present invention.
Figure 1B:
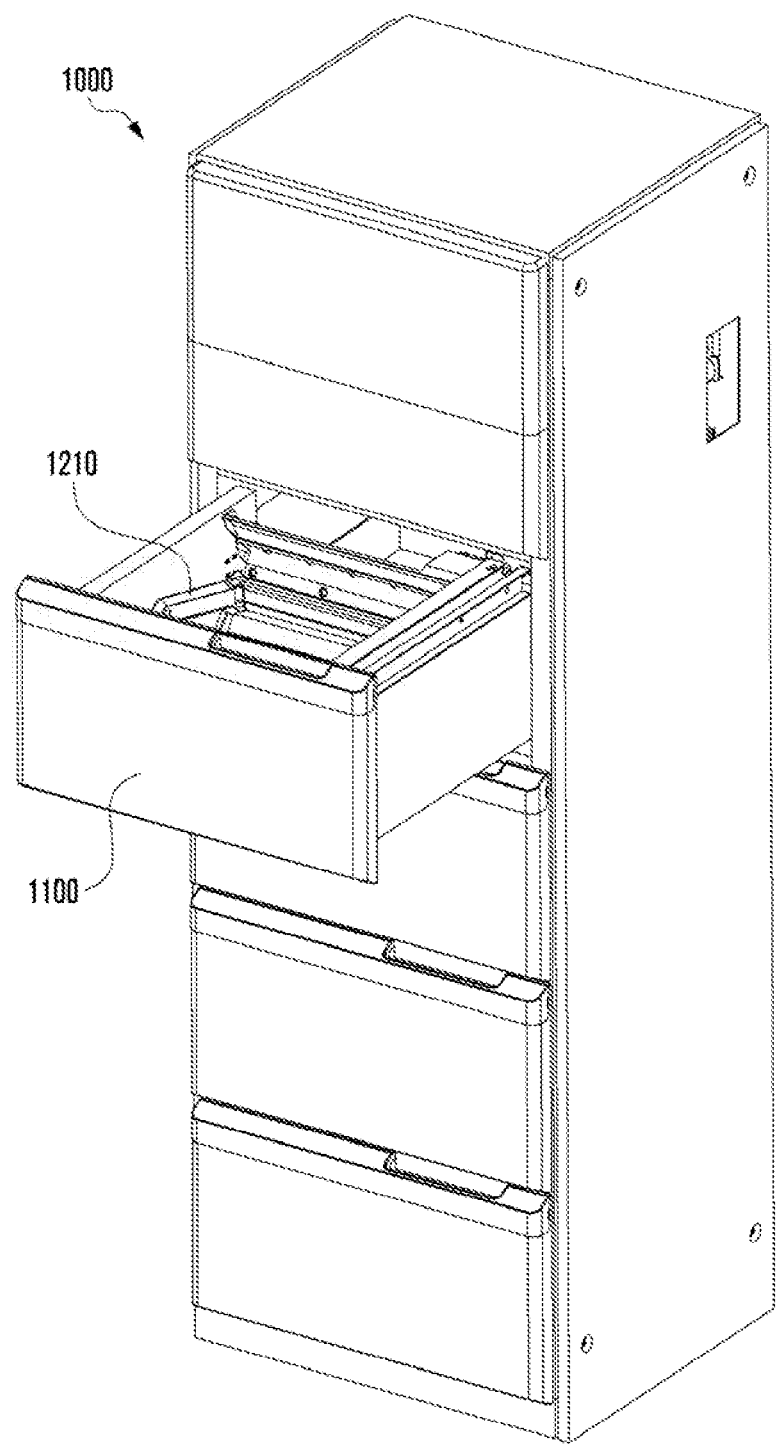
Figure 1C:
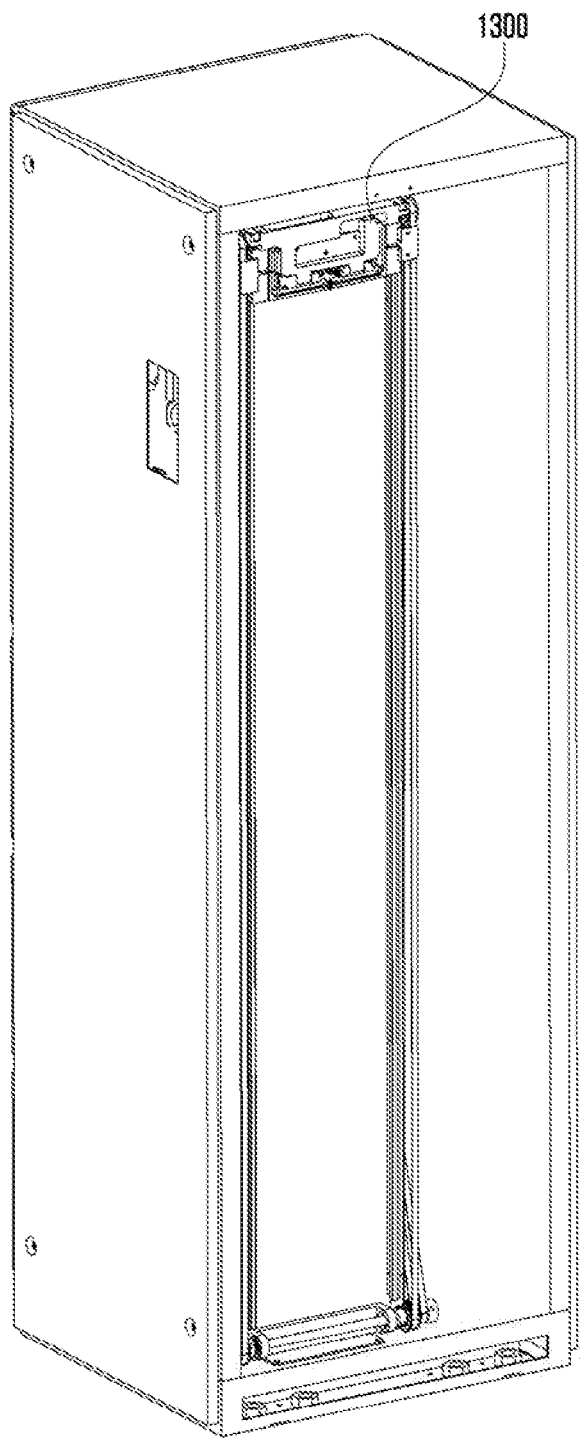

FIGS. 1A to 1C are perspective views illustrating an external form of a test tube automatic alignment and label attaching apparatus 1000 in various angles according to an embodiment of the present invention.

When describing the test tube automatic alignment and label attaching apparatus 1000 according to an embodiment of the present invention, a surface illustrated at a front surface based on an illustrated state of FIG. 1C may be one side direction of a basket 1100, and a surface illustrated at a front surface based on an illustrated state of FIG. 1A may be the other side direction of the basket 1100. That is, when describing based on an illustrated state of FIG. 1A, a front surface of the test tube automatic alignment and label attaching apparatus 1000 may mean the other side direction and a rear surface thereof may be mean one side direction.

A lateral direction based on an illustrated state of FIG. 1A may mean a width direction of the basket 1100, and a vertical direction thereof may mean a depth direction of the basket 1100.

A directional reference used in describing the test tube automatic alignment and label attaching apparatus 1000 according to an embodiment of the present invention is not absolute, and when any one direction is changed, the remaining directions may be changed according to a change of any one direction.

Figure 2A:
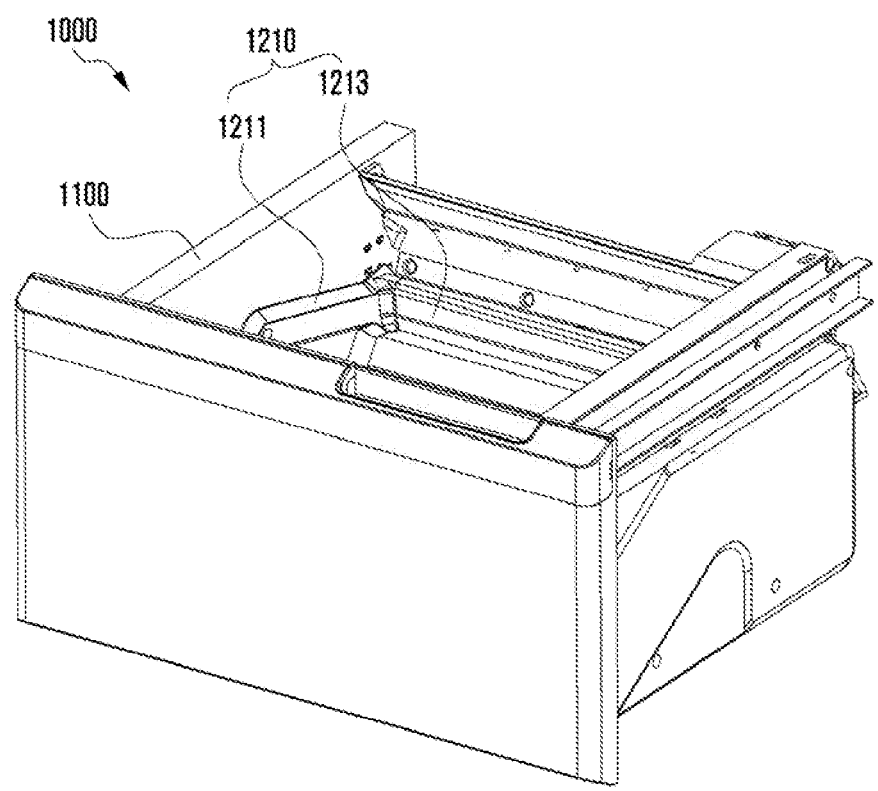
FIGS. 2A to 2C are perspective views illustrating an internal configuration of a test tube automatic alignment and label attaching apparatus in various angles according to an embodiment of the present invention.

FIG. 1A illustrates a configuration in which a plurality of baskets 1100 and test tube supply devices 1200 are stacked in the test tube automatic alignment and label attaching apparatus 1000 according to an embodiment of the present invention, and FIG. 2A illustrates a shape in which a random basket of a plurality of stacked baskets 1100 is slid drawn in a tray form. When a plurality of cylinders are poured without alignment into the basket 1100 withdrawn in this way, the test tube supply device 1200 disposed inside the basket 1100 aligns and discharges test tubes 2000 inside the basket 1100.

FIG. 1C is a rear view illustrating a test tube automatic alignment and label attaching apparatus 1000 according to an embodiment of the present invention. The test tube supply device 1200 of the test tube automatic alignment and label attaching apparatus 1000 according to an embodiment of the present invention may transfer the test tube 2000 supplied to the basket 1100 to one side direction of the basket 1100, i.e., to a test tube feeder 1300 positioned at a rear surface. As illustrated in FIGS. 1A and 1B, the test tube feeder 1300 may transfer the test tubes 2000 to a label attaching apparatus 1400 and finally the label attaching apparatus 1400 may print a label on a surface of the test tubes 2000 or attach a label to a surface of the test tubes 2000.

The test tube feeder 1300 according to an embodiment of the present invention may be disposed in only one unit or may be disposed in multiple units at several baskets 1100 and test tube supply devices 1200. In describing the test tube automatic alignment and label attaching apparatus 1000 according to an embodiment of the present invention, a case will be described in which one test tube feeder 1300 is disposed to correspond to a plurality of baskets 1100 and test tube supply devices 1200.

Figure 2B:
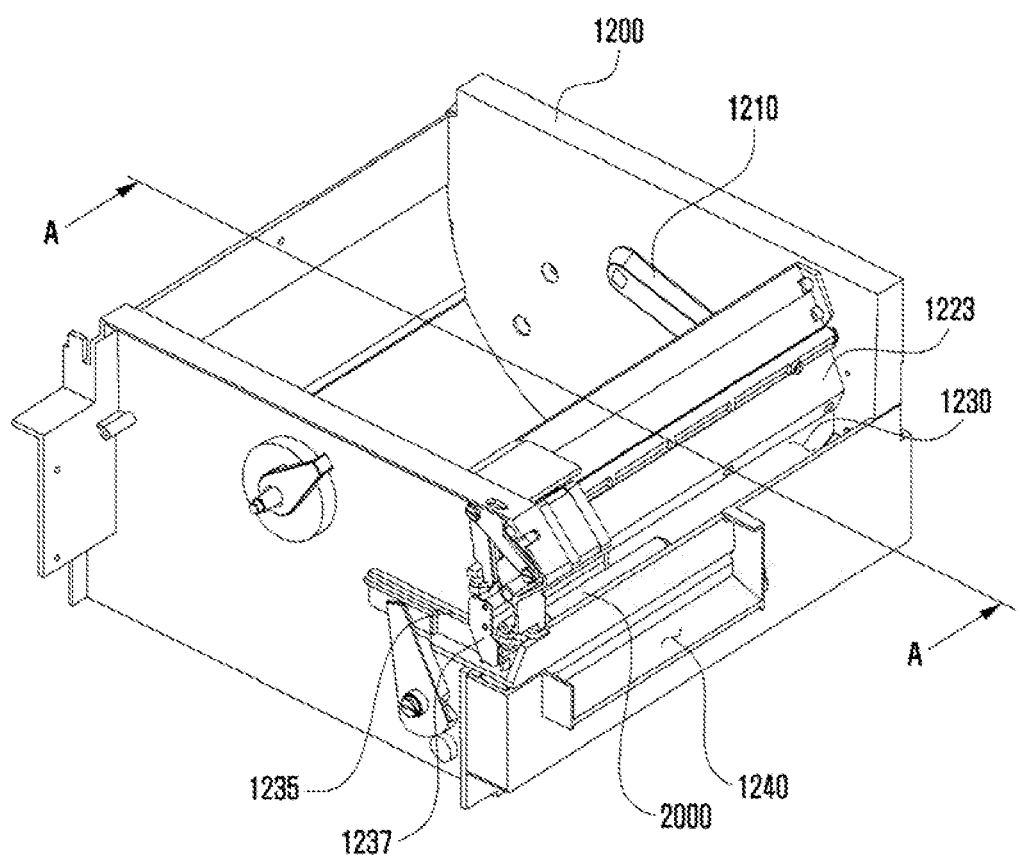
Figure 2C:
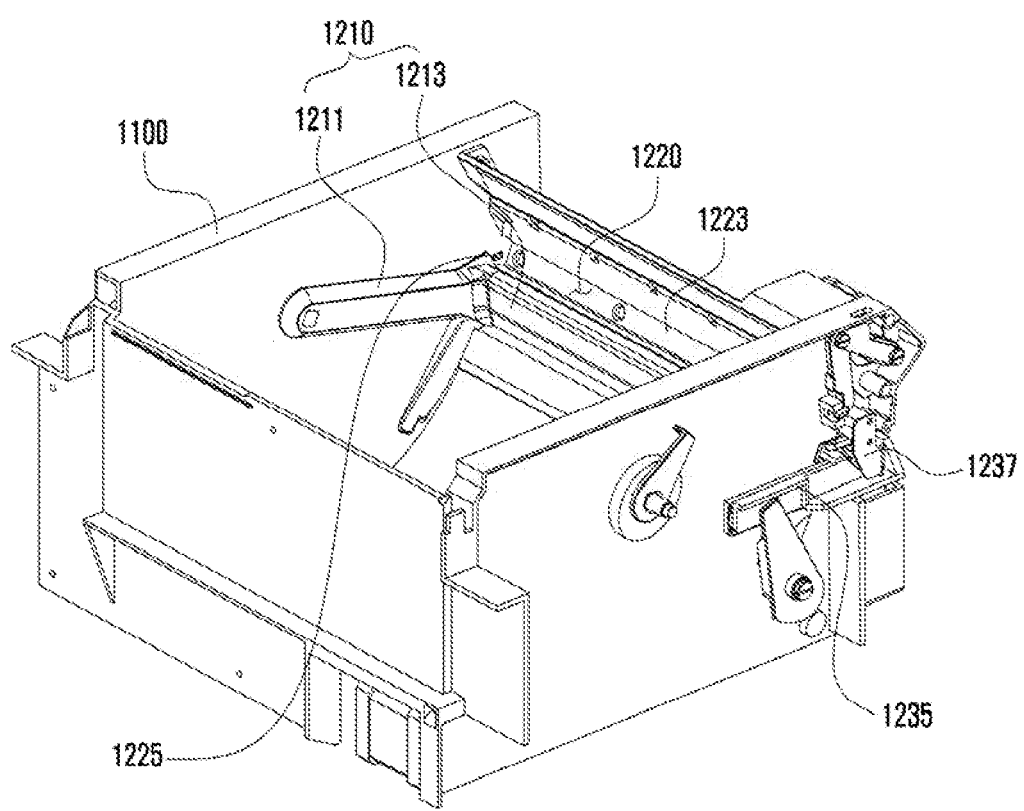

FIGS. 2A to 2C are perspective views illustrating an internal configuration of a test tube automatic alignment and label attaching apparatus 1000 in various angles according to an embodiment of the present invention.

FIG. 2A illustrates only one basket 1100 and one test tube supply device 1200 in the test tube automatic alignment and label attaching apparatus 1000, and FIGS. 2B to 2C are views removing a partial cover of the test tube automatic alignment and label attaching apparatus 1000 and illustrating the test tube automatic alignment and label attaching apparatus 1000 in different angles in order to view clearly an internal configuration of the test tube automatic alignment and label attaching apparatus 1000.

With reference to FIG. 2A, in an automatic alignment and label attaching apparatus 1000 according to an embodiment of the present invention, the basket 1100 and the test tube supply device 1200 are configured in one set to be coupled to a frame of the automatic alignment and label attaching apparatus 1000 in a tray form. FIG. 2A illustrates the basket 1100 and the test tube supply device 1200 slidably coupled in a tray form as an example, but the present invention is not limited thereto and may have any form that may be easily coupled as one set formed in a module.

With reference to FIGS. 2B to 2C, the automatic alignment and label attaching apparatus 1000 according to an embodiment of the present invention may include a basket 1100 and a test tube supply device 1200.

The basket 1100 according to an embodiment of the present invention may be formed in a box shape, and an upper surface thereof may be opened and a bottom surface thereof may be concave. The bottom surface of the basket 1100 may be formed in a semicircular shape or a fan shape corresponding to a radius of rotation of a swing bar 1210 to be described later based on a cross section taken along line A-A. That is, the bottom surface of the basket 1100 may be formed concave with a radius of curvature of a length corresponding to the radius of rotation of the swing bar 1210. More specifically, the radius of curvature of the bottom surface of the basket 1100 may be formed slightly longer than the radius of rotation of the swing bar 1210 and may be formed not to interfere a rotation of the swing bar 1210.

The basket 1100 according to an embodiment of the present invention may supply the test tube 2000 to the automatic alignment and label attaching apparatus 1000 through an open portion in a box form having an opened upper surface. When the test tube 2000 is supplied to the basket 1100, it is unnecessary to separately supply the test tube in a pallet in an alignment manner, and the test tubes may be supplied in a randomly pouring manner. The test tubes 2000 supplied to the basket 1100 are collected at the center of the basket 1100 along a concave shape of the bottom surface of the basket 1100.

The test tube supply device 1200 according to an embodiment of the present invention may include a swing bar 1210, a first buffer 1220, and a second buffer 1230.

The swing bar 1210 according to an embodiment of the present invention may rotate in a form of sweeping a bottom surface of the basket 1100 with a rotation shaft at a wall of a width direction of the basket 1100. The swing bar 1210 may include a first rod 1211 connected to the rotating shaft to provide a radius of rotation of the swing bar 1210 and a second rod 1213 formed to elongate in a width direction of the basket 1100 to sweep the bottom surface of the basket 1100.

The rotation shaft of the swing bar 1210 according to an embodiment of the present invention may be formed at both opposite side walls or at only one side wall. The swing bar 1210 may reciprocate in a range in which the swing bar 1210 does not protrude to the outside of the basket 1100 rather than rotating without a limit when rotating about the rotation shaft.

The second rod 1213 of the swing bar 1210 according to an embodiment of the present invention may align the test tubes 2000 randomly supplied to the basket 1100 while rotating to sweep the bottom surface of the basket 1100. For example, while the swing bars 1210 rotate, the second rod 1213 may enable the randomly supplied test tubes 2000 to be aligned and positioned in a width direction of the basket 1100.

The swing bar 1210 according to the embodiment of the present invention may push up the test tube 2000 along the bottom surface of the bottom of the basket 1100 and supply the test tube 2000 to the first buffer 1220 as well as align the test tubes 2000 supplied to the basket 1100. Specifically, when the swing bar 1210 rotates in one side direction of the basket 1100, the second rod 1213 pushes up a random test tube 2000 positioned at the bottom of the basket 1100 along the bottom surface of the basket 1100 to supply the test tube 2000 to the first buffer 1220.

The first buffer 1220 according to an embodiment of the present invention is formed in one side direction of the basket 1100 and may include a first seating groove 1221, an inclined wall 1223, and a first sensor 1225.

The first seating groove 1221 according to an embodiment of the present invention is connected to the bottom surface of the basket 1100 and may enable the test tube 2000 pushed up and supplied by the swing bar 1210 to be seated without falling again to the bottom surface of the basket 1100. The first seating groove 1221 may elongate in a width direction of the basket 1100 and may be formed so that the test tubes 2000 are seated only in one row in the width direction. However, two or more test tubes 2000 may be seated in a width direction in a range formed in one row.

The inclined wall 1223 according to an embodiment of the present invention may be rotatably disposed at a widthwise wall of the basket 1100 and may be inclined toward the first seating groove 1221. As the inclined wall 1223 rotates, the first buffer 1220 may be opened and the test tube 2000 may be transferred to the second buffer 1230. Further, as the inclined wall 1223 is formed to be inclined toward the first seating groove 1221, another test tube may be prevented from being stacked on the test tube 2000 seated in the first seating groove 1221. In a cross-section taken along line A-A of FIG. 2B, an inclination level of the inclined wall 1223 along the first seating groove 1221 should be formed so that the test tubes 2000 in which the center of the test tube 2000 seated the first seating groove 1221 and the center of the test tube stacked thereon are stacked with twistedly aligned instead of being vertically aligned fall again to the bottom surface of the basket 1100.

The first sensor 1225 according to an embodiment of the present invention may detect whether the test tube 2000 is seated in the first buffer 1220 and may be disposed within the first seating groove 1221 or at a wall surface of the basket 1100 in the vicinity of the first seating groove 1221.

The second buffer 1230 according to an embodiment of the present invention may be positioned at the lower side than the first buffer 1220 while being positioned in parallel to the first buffer 1220 in one side direction of the basket 1100. The second buffer 1230 may include a second seating groove 1231, a conveyor 1233, and a release device 1235.

The second seating groove 1231 according to an embodiment of the present invention has a shape to enable the test tube 2000 transferred from the first buffer 1220 to be stably seated and may elongate in a width direction of the basket 1100, as in the first seating groove 1221. The second seating groove 1231 may have a width to enable the test tube 2000 to be seated in one row, as in the first seating groove 1221 and have a length to enable two or more test tubes 2000 to be seated.

The conveyor 1233 according to an embodiment of the present invention may be formed at the bottom surface of the second buffer 1230 to enable the test tube 2000 to move to an end portion of one side in the second seating groove 1231. For example, as illustrated in FIG. 2B, the conveyor 1233 may feed the test tube 2000 to the end of a left end direction in the second seating groove 1231. The conveyor 1233 may be formed in various forms such as a belt type and a roller type, and may have a form that may feed the test tube 2000 in the second seating groove 1231.

The releasing device 1235 according to an embodiment of the present invention may separate the test tube 2000 fed from the inside of the second seating groove 1231 to an end portion of one side from the second buffer 1230 and transfer the test tube 2000 to the test tube feeder 1300. As illustrated in FIG. 2B, the release device 1235 may push out a side surface of the test tube 2000 to release the test tube 2000 from the second buffer 1230 through an opening 1240, and the test tube feeder 1300 may receive the released test tube 2000.

A second sensor 1237 according to an embodiment of the present invention determines whether the test tube 2000 has been fed to an end portion of one side of the second buffer 1230 and may be disposed inside the second seating groove 1231 or at a wall surface near the second seating groove 1231.

FIGS. 3A to 3E are views illustrating an operation of the test tube automatic alignment and label attaching apparatus 1000 according to an embodiment of the present invention.

Figure 3A:
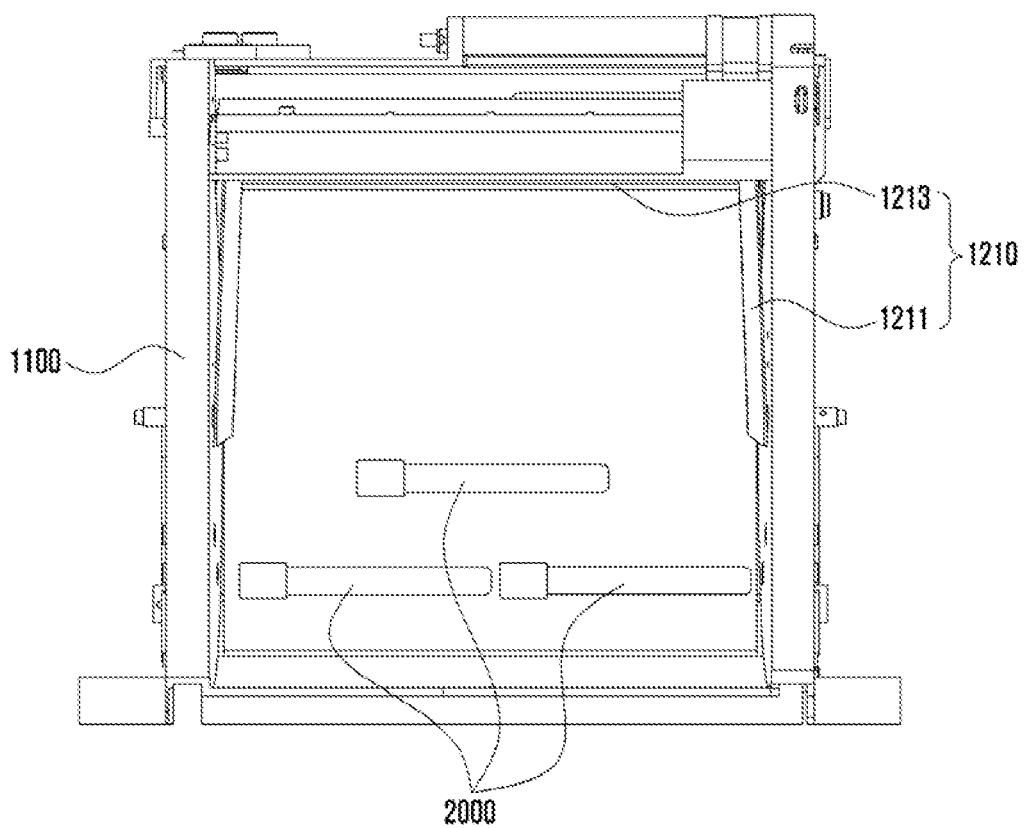
FIGS. 3A to 3E are views illustrating an operation process of a test tube automatic alignment and label attaching apparatus according to an embodiment of the present invention.

FIG. 3A is a plan view illustrating the test tube automatic alignment and label attaching apparatus 1000 according to an embodiment of the present invention, and FIGS. 3B to 3E are views sequentially illustrating a process in which the test tube 2000 supplied to the basket 1100 is transferred to the first buffer 1220 and the second buffer 1230 based on a cross-sectional view taken along line A-A of FIG. 2B.

The test tube automatic alignment and label attaching apparatus 1000 may include a controller (not illustrated) for receiving information from the first sensor 1225 and the second sensor 1237 according to an embodiment of the present invention to drive the swing bar 1210, the inclined wall 1223, the conveyor 1233, the release device 1235, and the test tube feeder 1300.

The controller (not illustrated) according to an embodiment of the present invention may have a general processor form that embeds a program that may receive signals from the first sensor 1225 and the second sensor 1237 and transfer a driving signal (e.g., power supply) to a driver of the swing bar 1210, the inclined wall 1223, the conveyor 1233, the release device 1235, and the test tube feeder 1300 according to a result thereof to control driving thereof.

Figure 3B:
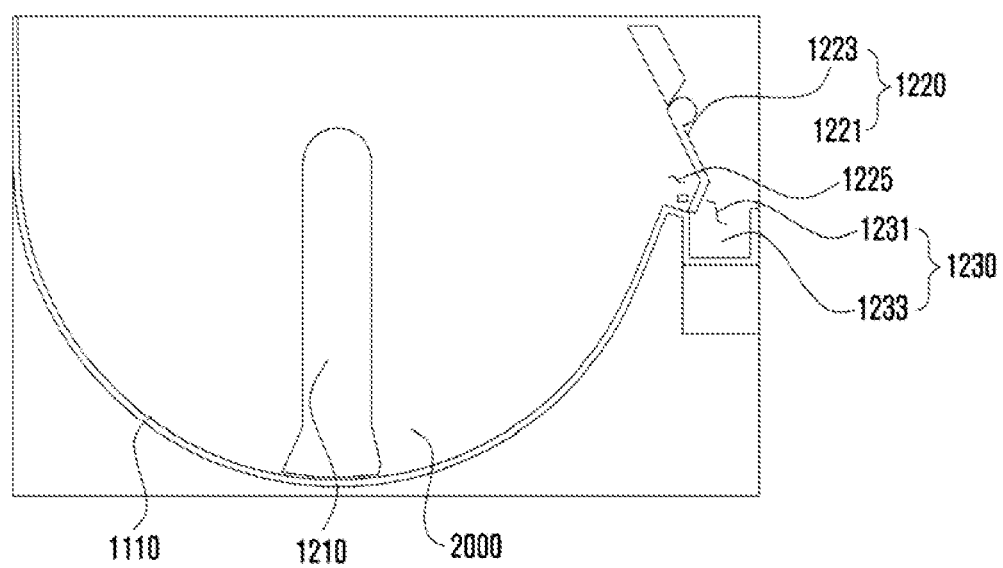
Figure 3C:
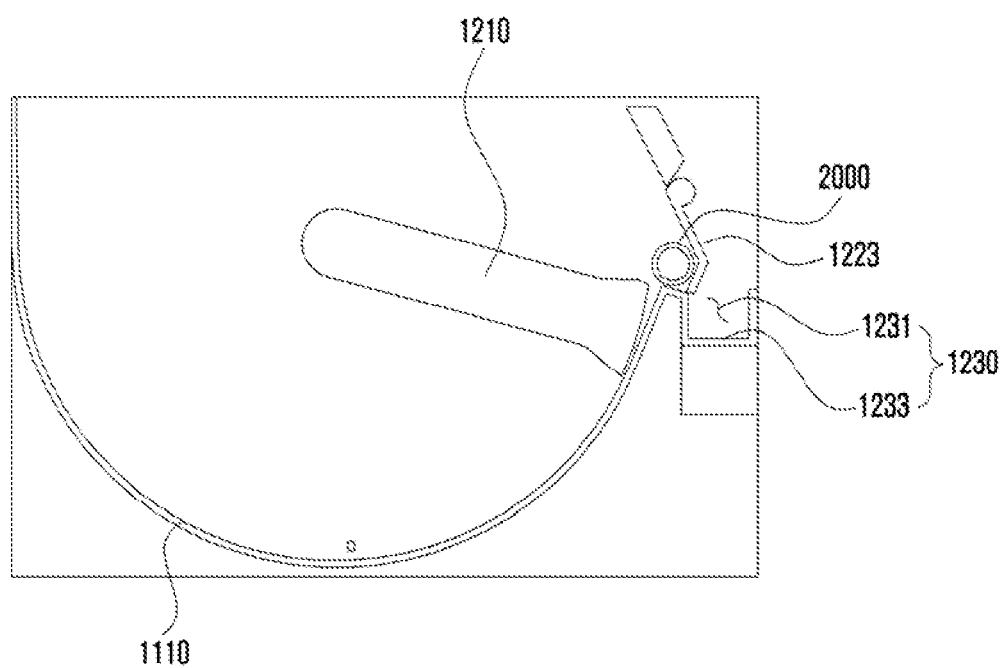
Figure 3D:
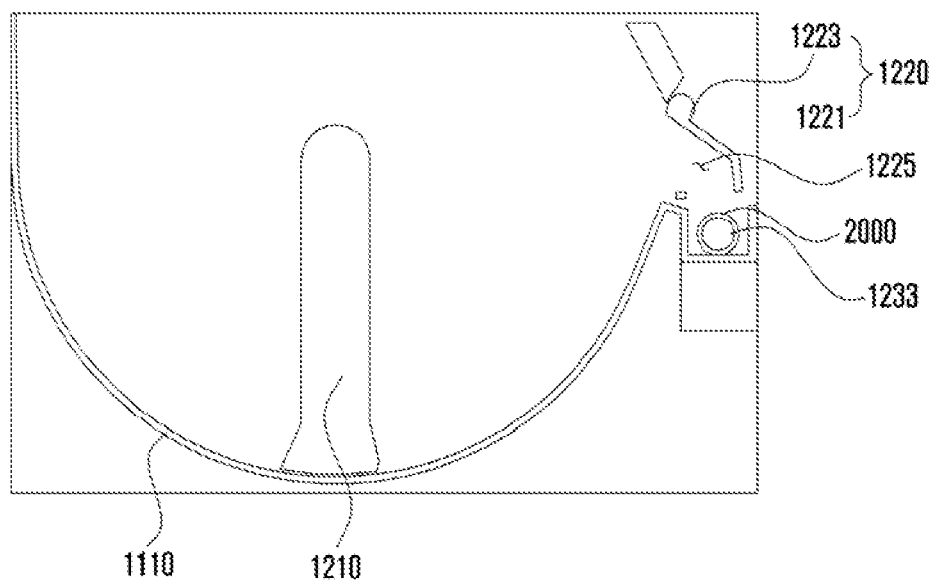
Figure 3E:
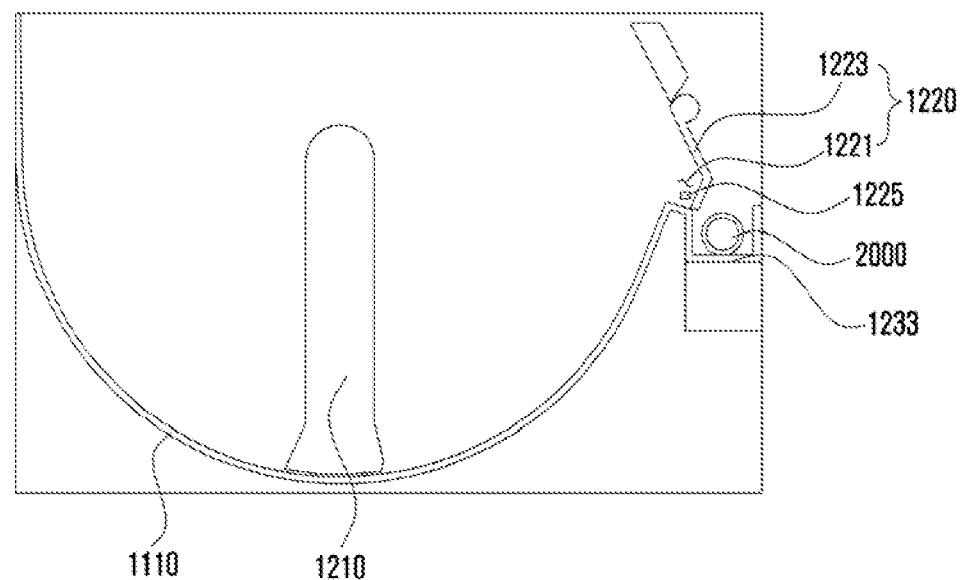
Figure 4:
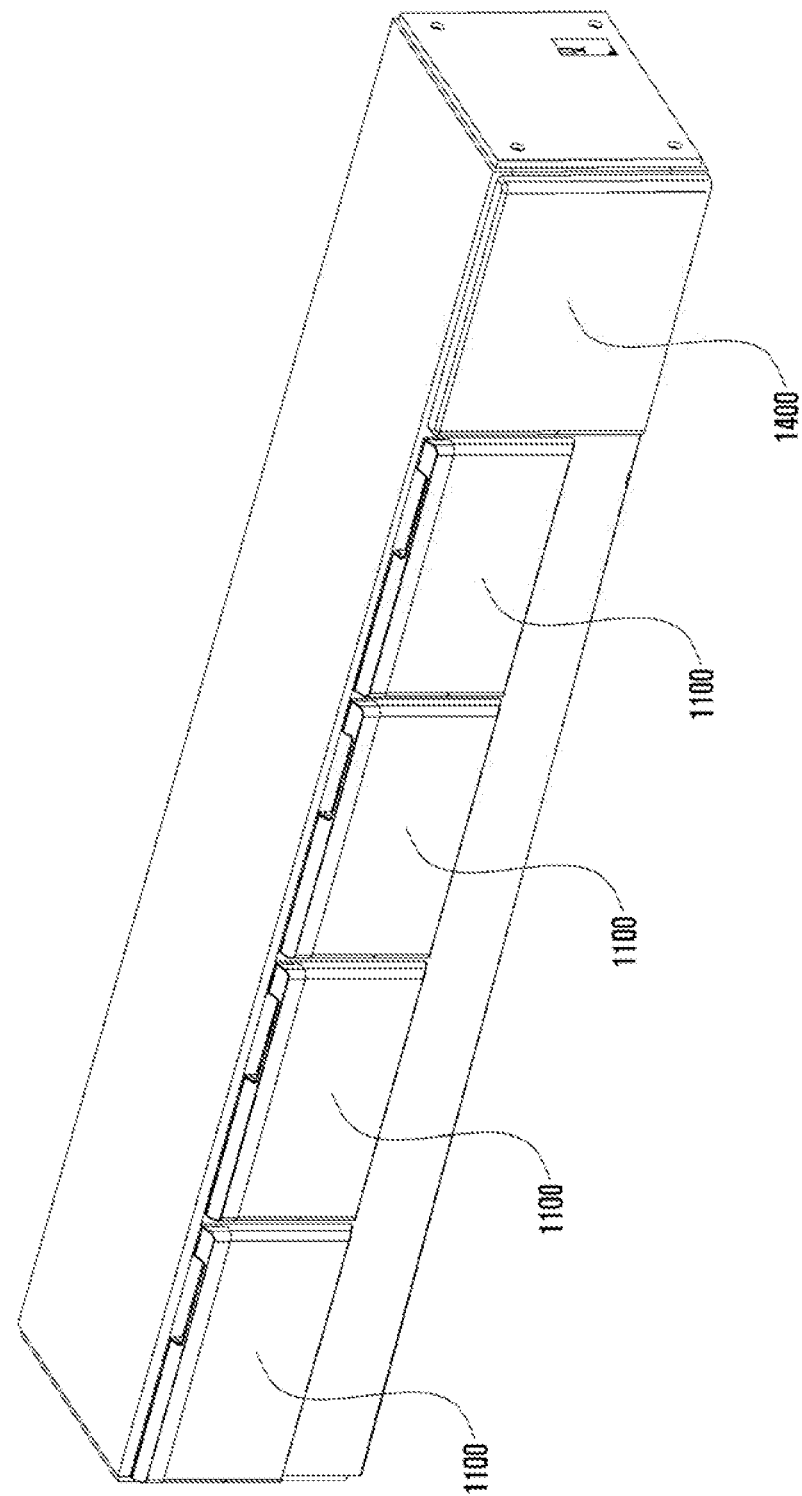
FIG. 4 is a perspective view illustrating an external form of a test tube automatic alignment and label attaching apparatus according to another embodiment of the present invention.

With reference to FIG. 3A, a plurality of test tubes 2000 randomly supplied to the basket 1100 may be aligned so that one or two or more test tubes 2000 are positioned in a width direction of the basket 1100 according to a rotation of the swing bar 1210. In FIGS. 3B and 4, in order to enable to easily understand an operation process of the test tube automatic alignment and label attaching apparatus 1000 according to an embodiment of the present invention, one test tube 2000 is exemplified.

With reference to FIG. 3B, a noise prevention pad 1110 may be disposed at a bottom surface of the basket 1100; thus, noise that may occur in a process of randomly supplying the test tube 2000 to the basket 1100 may be reduced to some extent, and the noise prevention pad 1110 may prevent the test tube 2000 from being damaged in a process of colliding with the basket 1100.

FIG. 3B illustrates a state in which the test tube 2000 is positioned at a bottom surface of the basket 1100 and in which the swing bar 1210 starts to push up in one side direction of the basket 1100. When the swing bar 1210 rotates to push up the test tube 2000 along the bottom surface of the basket 1100, the test tube 2000 is seated in the first seating groove 1221 of the first buffer 1220 disposed in one side direction of the basket 1100, as illustrated in FIG. 3. The controller (not illustrated) determines whether the test tube 2000 is seated in the first seating groove 1221 by the first sensor 1225, and if the test tube 2000 is seated in the first seating groove 1221, the controller (not illustrated) returns the swing bar 1210 to a state of FIG. 3B. The controller (not illustrated) rotates the inclined wall 1223 to transfer the test tube 2000 positioned at the first seating groove 1221 to the second buffer 1230. The first seating groove 1221 may be inclined in a direction of the second buffer 1230 to enable the test tube 2000 to be naturally transferred toward the second buffer 1230 by a load of the test tube 2000.

The test tube 2000 transferred toward the second buffer 1230 according to an embodiment of the present invention is seated in the second seating groove 1231 of the second buffer 1230, and the controller (not illustrated) may control the conveyer 1233 to feed the test tube 2000 to an end portion of one side of the second seating groove 1231 and determine whether the test tube 2000 is fed through the second sensor 1237.

FIG. 4 is a perspective view illustrating an external form of a test tube automatic alignment and label attaching apparatus 1000 according to another embodiment of the present invention, and the test tube automatic alignment and label attaching apparatus 1000 may have a form laterally arranged, unlike FIGS. 1A to 1C. Although not separately illustrated, as illustrated in FIG. 1C, the test tube feeder 1300 may be disposed at the rear surface, and as illustrated in FIG. 1C, when the test tube feeder 1300 feeds the test tube in a vertical direction, the test tube feeder 1300 may feed the test tube in a lateral direction in a case of FIG. 4.

A test tube automatic alignment and label attaching apparatus according to an embodiment of the present invention includes a basket formed in a box shape and whose upper surface is open to receive a plurality of test tubes and having a concave bottom surface; a test tube supply device mounted inside the basket and configured to discharge test tubes received in the basket to one side of the basket; and a test tube feeder configured to move the test tubes discharged from one side of the basket.

The test tube supply device may include a swing bar having the center of rotation at a wall surface of the basket and configured to rotate along a concave bottom surface of the basket and to push the test tube to one side of the basket; and a first buffer formed at one side of the basket and configured to seat a test tube pushed by the swing bar.

The first buffer may include a first seating groove configured to seat the test tube in order to prevent the test tube from falling to the bottom surface of the basket; and an inclined wall inclined toward the first seating groove and configured to prevent another test tube from being stacked on the test tube seated in the first seating groove.

The test tube supply device may further include a second buffer positioned parallel to the first buffer in one side direction of the basket and positioned at the lower side than the first buffer, and the test tube may be supplied to the second buffer when opening the first buffer by rotation of the inclined wall of the first buffer.

The second buffer may include a second seating groove configured to seat the test tube; a conveyor configured to feed the test tube in the second seating groove; and a releasing device configured to push the test tube in one side direction of the basket to transfer the test tube from the conveyor to the test tube feeder.

The conveyor may feed the test tube to an end portion of one side of the second seating groove, and the releasing device may transfer the test tube to the test tube feeder.

The test tube automatic alignment and label attaching apparatus may further include a label attaching apparatus configured to attach a label to a surface of the test tube, and the test tube feeder may transfer the test tube transferred from the second buffer to the label attaching apparatus.

In the first buffer, a first sensor may be disposed to detect whether the test tube is seated.

At the end portion of one side of the second seating groove, a second sensor may be disposed to detect whether the test tube is fed.

The basket and the test tube supply device may be provided in the plural and stacked, and the test tube feeder may transfer the test tubes transferred from the plurality of test tube supply devices to the label attaching apparatus.

A plurality of baskets and test tube supply devices may be arranged in parallel, and the test tube feeder may transfer the test tube transferred from the plurality of test tube supply devices to the label attaching apparatus.

A noise prevention pad may be formed at the bottom surface of the basket.

The bottom surface of the basket may be concavely formed with a radius of curvature corresponding to a radius of rotation of the swing bar.

A test tube automatic alignment and label attaching apparatus according to an embodiment of the present invention includes a basket configured to receive a plurality of test tubes; a test tube supply device including a first buffer configured with a swing bar, a first seating groove, an inclined wall, and a first sensor, and a second buffer configured with a second seating groove, a conveyor, a releasing device, and a second sensor; a test tube feeder configured to move the test tube discharged from the test tube supply device; a label attaching apparatus configured to attach a label to a surface of a test tube; and a controller configured to receive information from the first sensor and the second sensor and to control driving of the swing bar, the inclined wall, the conveyor, the releasing device, and the test tube feeder.

When the controller detects that the swing bar has supplied the test tube to the first seating groove of the first buffer through the first sensor, the controller may be configured to recover a position of the swing bar and to drive the inclined wall to transfer the test tube to the second seating groove of the second buffer.

When the test tube is transferred to the second seating groove of the second buffer, the controller may be configured to control the conveyor to feed the test tube to an end portion of one side of the second seating groove.

When the test tube has been fed to an end portion of one side of the second seating groove through the second sensor, the controller may be configured to drive the releasing device to control to transfer the test tube to the test tube feeder.

The controller may be configured to drive the test tube feeder to control to transfer the test tube to the label attaching apparatus.

A test tube automatic alignment and label attaching apparatus can attach labels to test tubes by randomly supplying the test tubes and aligning the test tubes in a self-aligning manner without necessity to align in advance and supply the test tubes according to a form of the label attaching apparatus, thereby reducing a time to be consumed in a test tube label attaching work.

Although embodiments of the present invention have been described in detail hereinabove, it should be clearly understood that many variations and modifications of the basic inventive concepts herein described, which may appear to those skilled in the art, will still fall within the spirit and scope of the embodiments of the present invention as defined in the appended claims.

What is claimed is:

1. A test tube automatic alignment and label attaching apparatus, comprising:
    a basket formed in a box shape and whose upper surface is open to receive a plurality of test tubes and having a concave bottom surface;
    a test tube supply device mounted inside the basket and configured to discharge test tubes received in the basket to one side of the basket; and
    a test tube feeder configured to move the test tubes discharged from one side of the basket,
    wherein the test tube supply device comprises:
    a swing bar having the center of rotation at a wall surface of the basket and configured to rotate along the concave bottom surface of the basket and to push the test tube to one side of the basket; and
    a first buffer formed at one side of the basket and configured to seat a test tube pushed by the swing bar.

2. The test tube automatic alignment and label attaching apparatus of claim 1, wherein the first buffer comprises:

a first seating groove configured to seat the test tube in order to prevent the test tube from falling to the bottom surface of the basket; and an inclined wall inclined toward the first seating groove and configured to prevent another test tube from being stacked on the test tube seated in the first seating groove.

3. The test tube automatic alignment and label attaching apparatus of claim 2, wherein the test tube supply device further comprises a second buffer positioned parallel to the first buffer in one side direction of the basket and positioned lower than the first buffer, wherein the test tube is supplied to the second buffer when opening the first buffer by rotation of the inclined wall of the first buffer.

4. The test tube automatic alignment and label attaching apparatus of claim 3, wherein the second buffer comprises:
a second seating groove configured to seat the test tube;
a conveyor configured to feed the test tube in the second seating groove; and
a releasing device configured to push the test tube in one side direction of the basket to transfer the test tube from the conveyor to the test tube feeder.

5. The test tube automatic alignment and label attaching apparatus of claim 4, wherein the conveyor feeds the test tube to an end portion of one side of the second seating groove, and the releasing device transfers the test tube to the test tube feeder.

6. The test tube automatic alignment and label attaching apparatus of claim 5, wherein at the end portion of one side of the second seating groove, a second sensor is disposed to detect whether the test tube is fed.

7. The test tube automatic alignment and label attaching apparatus of claim 4, further comprising a label attaching apparatus configured to attach a label to a surface of the test tube, wherein the test tube feeder transfers the test tube transferred from the second buffer to the label attaching apparatus.

8. The test tube automatic alignment and label attaching apparatus of claim 7, wherein the basket and the test tube supply device are provided in the plural and stacked, and the test tube feeder transfers the test tubes transferred from the plurality of test tube supply devices to the label attaching apparatus.

9. The test tube automatic alignment and label attaching apparatus of claim 7, wherein a plurality of baskets and test tube supply devices are arranged in parallel, and the test tube feeder transfers the test tube transferred from the plurality of test tube supply devices to the label attaching apparatus.

10. The test tube automatic alignment and label attaching apparatus of claim 1, wherein in the first buffer, a first sensor is disposed to detect whether the test tube is seated.

11. The test tube automatic alignment and label attaching apparatus of claim 1, wherein a noise prevention pad is formed at the bottom surface of the basket.

12. The test tube automatic alignment and label attaching apparatus of claim 1, wherein the bottom surface of the basket is concavely formed with a radius of curvature corresponding to a radius of rotation of the swing bar.

13. A test tube automatic alignment and label attaching apparatus, comprising:
a basket formed in a box shape and whose upper surface is open to receive a plurality of test tubes and having a concave bottom surface;
a test tube supply device mounted inside the basket and comprising a first buffer configured with a swing bar, a first seating groove, an inclined wall, and a first sensor, and a second buffer configured with a second seating groove, a conveyor, a releasing device, and a second sensor to discharge one test tube among a plurality of test tubes received in the basket to one side of the basket;
a test tube feeder configured to move the one test tube discharged from the test tube supply device;
a label attaching apparatus configured to attach a label to a surface of the one test tube moved from the test tube supply device; and
a controller configured to receive information from the first sensor and the second sensor and to control driving of the swing bar, the inclined wall, the conveyor, the releasing device, and the test tube feeder.

14. The test tube automatic alignment and label attaching apparatus of claim 13, wherein the controller is configured to recover a position of the swing bar and to drive the inclined wall to transfer the test tube to the second seating groove of the second buffer when the controller detects that the swing bar has supplied the test tube to the first seating groove of the first buffer through the first sensor.

15. The test tube automatic alignment and label attaching apparatus of claim 14, wherein the controller is configured to control the conveyor to feed the test tube to an end portion of one side of the second seating groove when the test tube is transferred to the second seating groove of the second buffer.

16. The test tube automatic alignment and label attaching apparatus of claim 15, wherein the controller is configured to drive the releasing device to control to transfer the test tube to the test tube feeder when the test tube has been fed to an end portion of one side of the second seating groove through the second sensor.

17. The test tube automatic alignment and label attaching apparatus of claim 16, wherein the controller is configured to drive the test tube feeder to control to transfer the test tube to the label attaching apparatus.

* * * * *